(12) United States Patent
Meadow et al.

(10) Patent No.: US 8,213,743 B2
(45) Date of Patent: Jul. 3, 2012

(54) METHODS AND APPARATUS FOR GENERATING A CONTINUUM OF IMAGE DATA

(76) Inventors: William D. Meadow, Jacksonville, FL (US); Randall A. Gordie, Jr., St. Augustine, FL (US)

( * ) Notice: Subject to any disclaimer, the term of this patent is extended or adjusted under 35 U.S.C. 154(b) by 0 days.

(21) Appl. No.: 13/025,819

(22) Filed: Feb. 11, 2011

(65) Prior Publication Data

US 2012/0087597 A1  Apr. 12, 2012

Related U.S. Application Data

(62) Division of application No. 11/702,708, filed on Feb. 6, 2007, now Pat. No. 7,929,800.

(51) Int. Cl.
*G06K 9/36* (2006.01)

(52) U.S. Cl. ........ 382/284; 382/282; 382/294; 358/540; 358/450

(58) Field of Classification Search .................. 382/282, 382/284, 294; 358/540, 450
See application file for complete search history.

(56) References Cited

U.S. PATENT DOCUMENTS

| | | | | |
|---|---|---|---|---|
| 6,963,657 | B1* | 11/2005 | Nishigaki et al. | 382/106 |
| 7,171,058 | B2* | 1/2007 | Luo | 382/298 |
| 7,444,003 | B2* | 10/2008 | Laumeyer et al. | 382/103 |
| 7,702,821 | B2* | 4/2010 | Feinberg et al. | 710/13 |

* cited by examiner

*Primary Examiner* — Yosef Kassa
(74) *Attorney, Agent, or Firm* — Joseph P. Kincart

(57) ABSTRACT

The present invention provides methods and apparatus for generating a continuum of image data. The continuum can include image data representing a street level view of a geographic area. The image data can be captured at multiple disparate points along another continuum. Each continuum of image data can include a ribbon of data representing the geographic area. In some examples, image data can be simultaneously captured which represents multiple continuums of image data.

20 Claims, 5 Drawing Sheets

METHODS AND APPARATUS FOR GENERATING A CONTINUUM OF IMAGE DATA

CROSS REFERENCE TO RELATED APPLICATIONS

The present application claims priority to patent application Ser. No. 11/702,708, filed, Feb. 6, 2007 now U.S. Pat. No. 7,929,800 and entitled, "Method and Apparatus for Generating a Continuum of Image Data" as a Divisional Application.

FIELD OF THE INVENTION

The present invention relates to methods and apparatus of generating image data. More specifically, the present invention relates to generating data descriptive of a continuum of images, such as those comprising a geographic setting.

BACKGROUND OF THE INVENTION

Images of geographic areas created on a local basis have been created in numerous formats. Photographs, movie cameras, video camera recorders, and more recently digital recorders have all been utilized to capture moving images of a geographic parcel. Photographs can be useful because they are easily associated with a particular real estate parcel, however they are limited in the scope of the subject matter that they can include. In addition, photographs must be manually acquired and docketed in order to be associated with a property and subsequently retrieved. Panoramas can increase the scope of the subject matter to a point, but are limited by a point of capture of the panoramic views.

Movie pictures, video recorders and digital recorders and other "motion pictures" provide for increased scope of image capture. However, it is sometimes difficult to locate and view a particular portion of interest of images captured as motion pictures. In addition, correlation of particular portions of a motion picture with a particular real estate parcel can be difficult if the motion picture includes more than one real estate parcel. For example, it is relatively difficult to locate and view a particular real estate parcel in the context of its neighborhood setting, or particular aspects of its setting.

In addition, aerial images, such as satellite pictures of geographic areas have been captured and specific parcels of land or landmarks can be located on the aerial images.

However, prior to the present invention, there has not been a mechanism for accurately correlating ground level images with substantial portions of an aerial image in a consistent and orderly format that allows for the identification of a particular parcel of land and provide both aerial and ground level views of the parcel, as well as a surrounding area of the parcel. Similarly, prior to the present invention, there has not been a method for correlating geopolitical indicators, such as property lot lines, or tax map parcels with aerial images and ground level video images.

Substantial portions of ground level images have not been correlated with aerial images or with geopolitical indicators, in part, because there has not been any image vehicle capable to providing a format of high quality and accurate representations of street level images capable of being matched to macro level image data.

SUMMARY OF THE INVENTION

Accordingly, the present invention provides methods and apparatus for generating a continuum of image data. In some embodiments, the continuum of image data provides a two dimensional ribbon of street level views of geographic areas. The ribbons are created by capturing two or more images of a subject, wherein each of the two or more images are captured from disparate points on a continuum. For example, each of the two or more images can be captured from a different position on a street as a vehicle drives down the street. Generally, the images will be captured from an orthogonal view of the subject.

Portions of the two or more images are then aligned in a dimension consistent with the continuum, wherein, according to our example the continuum includes the path of the vehicle. Therefore, the images would be aligned in a dimension consistent with the path of the vehicle. A composite image of the subject is generated from the aligned portions of the two or more images.

In some embodiments, positional data is recorded that is descriptive of a respective location of each of the two or more images. The positional data can include, for example, latitude and longitude coordinates and can be used to associate the composite image with a particular portion of the subject. It is also within the scope of the invention to record the altitude of a camera used to capture the image data and thereby approximating the altitude of the subject matter of the image data.

In some embodiments, a camera will be maintained approximately orthogonal to the subject captured and therefore, those embodiments will maintain the camera at an angle about between 75° and 105° in relation to the subject matter.

In another aspect, some embodiments can include various overlays of information on top of the continuum of image data. Overlays can include one or more of: metadata; data related to a composite image; and geospatial information.

BRIEF DESCRIPTION OF THE DRAWINGS

As presented herein, various embodiments of the present invention will be described, followed by some specific examples of various components that can be utilized to implement the embodiments. The following drawings facilitate the description of some embodiments.

DETAILED DESCRIPTION OF PREFERRED EMBODIMENTS

The present invention provides methods and apparatus for capturing image data from multiple disparate points along a continuum and assembling the image data into a composite image. In some embodiments, the composite image can include its own continuum of two dimensional image data.

Some embodiments can also include storing the captured image data with positional data related to the captured image data. The positional data can include, or be derived, for example, from latitude and longitude coordinates of the position of a camera used to capture the image data as well as an orientation of the camera.

DEFINITIONS

As used herein, Video DriveBy™ refers to street level video data captured in multiple angles encompassing a 360° view.

As used herein, Video FlyBy™ refers to Aerial/Satellite oblique (angular) view images with polygon line views.

As used herein, RibbonView™ refers to a film strip like view of properties which stands up at approximately 90° from a flat or angled aerial/satellite ortho image map and provides direct-on front images of properties to be displayed.

As used herein, Flash Viewer (Streaming Video) refers to direct streaming of video to an online user via a web browser.

Methods

Figure 1A:
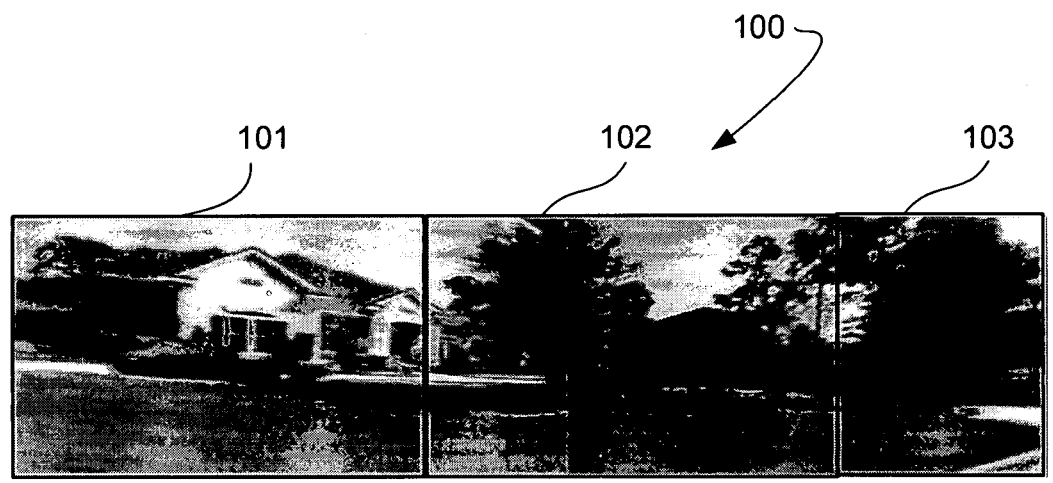
FIG. 1A illustrates basic geographic images captured from a camera at disparate points along a continuum and aligned with post processing.

Referring now to FIG. 1A, three images 101-103 are illustrated. Each of the images 101-103 is reproduced from image data captured from a disparate point on a continuum. As illustrated, a composite image 100 is formed by aligning two or more of the image data sets. Unlike stitching processes previously known, the present invention creates a composite through alignment of portions of data from more than one data set. Alignment can be accomplished in image data processing. Using image data processing, the images 101-103 are aligned to form a composite image 100. The composite image 100 is essentially two dimensional image data arranged as a second continuum, or ribbon. The second continuum includes ongoing image data 101-103 captured from the points defining the first continuum.

In some particular embodiments, the series of points of image capture in the first continuum includes positions of a vehicle carrying an image capture device, such as a camera, as the vehicle traverses a path proximate to a geographic area. The camera is positioned to capture image data of the geographic area. Image data 101-103 is periodically captured as the vehicle traverses the path. The motion of the vehicle, combined with the periodic capture of image data 101-103, thereby results in image data 101-103 being captured from disparate points along the first continuum.

A preferred embodiment includes capture of image data with a camera maintained orthogonal to the subject. Orthogonal capture of the image data provides consistency for subsequent composite of portions of the image data captured. Therefore, data captured at an angle of between about 75° and 105° can provide data most easily assembled into a continuum of data. However, other angles may be used to create different effects.

During image data processing, some or all of the images are aligned to form a composite image in the form of a continuous pictorial representation of the geographic area. One commercial embodiment of a continuous pictorial representation includes RibbonView™ by Real Data Systems. RibbonView™ correlates a ribbon of geographic image data with geospatial designations to facilitate identification of a particular geographic area, as discussed more fully below. In various embodiments, image capture processing can be accomplished in real time or via post image capture processing.

Figure 1B:
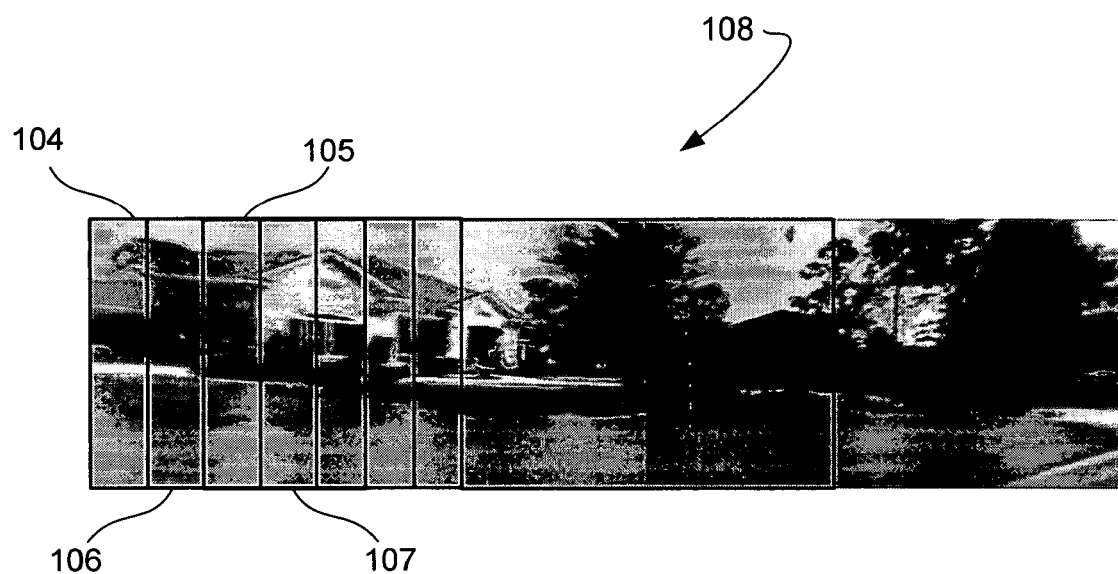
FIG. 1B illustrates an alignment of portions of two or more images captured from disparate points along a continuum to form a composite image.

Referring now to FIG. 1B, in some embodiments, select portions 104-107 of two or more sets of captured image data are aligned to generate the composite image 108. As illustrated, some preferred embodiments include vertical slices of data 104-107 aligned in a horizontal plane to form the composite image 108. Unlike a traditional photograph taken with a macro lens, according to the present invention, the length of a horizontal plane defining a composite image 108 is only limited by the length of a continuum along which points are defined and from which image data 104-107 is captured.

The use of only slices of data 104-107 from any particular captured image provides for a higher quality image 108. The quality is increased, for example, when a temporary obstruction, such as a passing car, person or animal, captured in one image data set, is only represented in a thin slice of a continuous ribbon 104-107 data. In addition, alignment of multiple thin slices of image data 104-107 is facilitated from the perspective of which aberrations typical human sensory is capable of distinguishing. Numerous thin slices 104-107 are perceived as a smoother transition across the horizontal plane defining the composite image 108 removing a choppiness that may be experienced with the use of larger data images.

The present invention can include a uniform width of each slice of data 104-107 or a variable width. The width of a particular slice may vary, for example, upon one or more of the velocity of a vehicle from which image data sets are captured, the sample rate of a camera used to capture an image data set 101-103, the resolution of a picture comprising an image data set 101-103 and the path of a camera. A high resolution image generated by a 2.1 mega pixel camera may have a 1600 by 1200 resolution and allow for a thinner slice 104-107 that includes a width of between about 5 to 100 pixels of an image data set. Embodiments with very high quality can include a slice 104-107 of between 1 to 2 pixels.

From a different perspective, some embodiments can include a slice 104-107 of an image data set 101-103 that includes a percentage of the image data set 101-103. Accordingly, some preferred embodiments can include a slice 104-107 of between about 5% to about 12% of an image data set. Other preferred embodiments can include up to about 50% of an image data set. However, it should be understood that some embodiments include a slice 104-107 that constitutes any fraction of the complete image data set.

Figure 2:
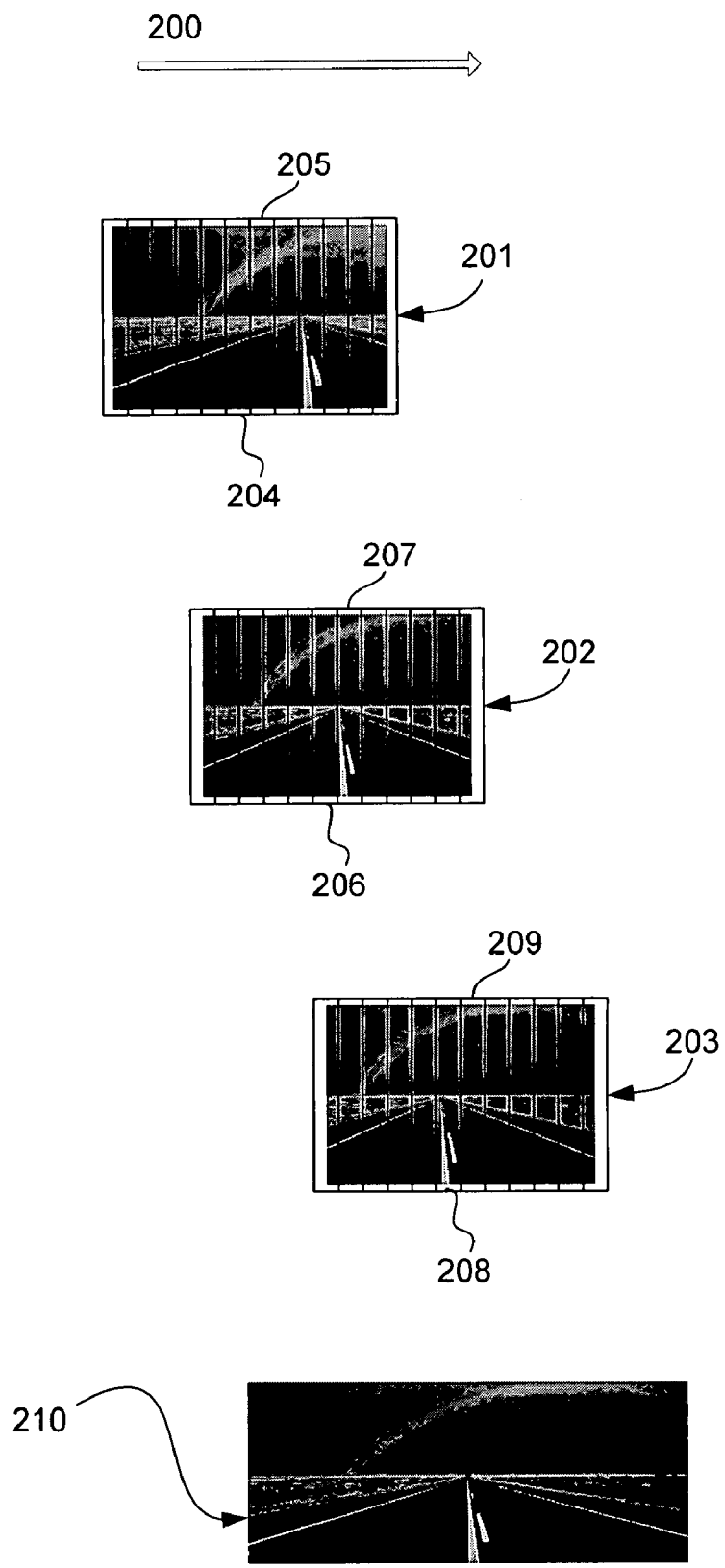
FIG. 2 illustrates multiple images captured from disparate points along a continuum and specific vertical slices that can be selected to create a composite image.

Referring now to FIG. 2, three sets of image data 201-203 are illustrated, wherein each set of image data 201-203 represents data captured from a disparate point on a continuum proximate to the landscape captured. A direction of travel along the continuum 200 is also illustrated. Each data set 201-203 is divided into multiple slices of image data 204-209. A composite image 210 is generated from the multiple slices 204-209, and in the exemplary case at hand, additional slices from additional image data sets.

It should be noted that although preferred embodiments may utilize vertical rectangular slices 204-209, the scope of the present invention is not limited by which portion of an image data set 201-203 is utilized to generate a composite image 210. Therefore, it is within the scope of the invention to use any portion of any image data set 201-203 to generate a composite image. Accordingly, slices of an image 201-203 other than vertical slices 204-209 may be apportioned and combined into a composite image 210. Slices may therefore include a slice angled at 60° or 75°, or other angle conducive to a particular application. In addition, it is also within the scope of the present invention to utilize irregular shaped portions of two or more image data sets 201-203 to generate a composite image 210.

In some embodiments, a database or other data processing mechanism, can track each portion or slice 204-208 utilized to construct a continuum and associate the slice 204-208 with an original image 201-203 from which the slice 204-208 is derived. User interactive devices can execute the retrieval of an entire original image 201-203 or a series of original images 201-203 upon request. In some instances, one or more original images 201-203 may provide detail not included in the composite image 208.

Figure 3:
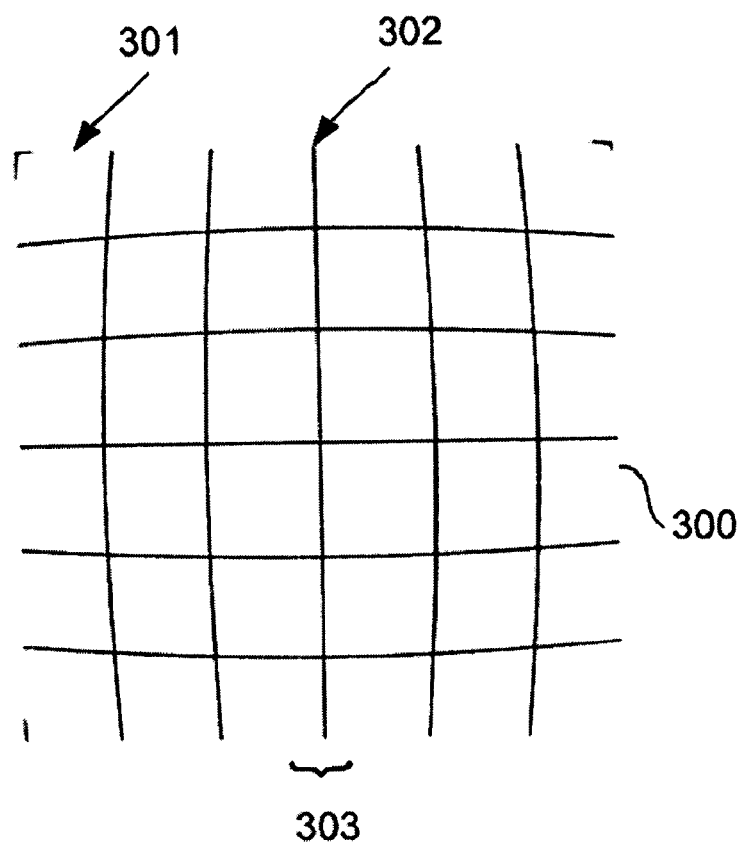
FIG. 3 illustrates a block diagram of exemplary lens distortion factors and a preferred area of lens capture that can be selected in some embodiments of the present invention.

Referring now to FIG. 3, in some embodiments, a selected portion 303 of an image data set 300 may be determined by the physical attributes of the equipment used to capture an image data set. For example, a typical camera lens can impart some distortion to an image data set, as represented in the illustration by an elongated portion 301 and a compressed portion 302. Utilizing only a portion 302 of an image data set 300, such as, for example, a center portion vertical slice 303, can minimize the effect of distortion introduced by a lens, or other source, to a composite image 108. Distortion is minimized when the composite image 108 is made to include those portions of the image data set corresponding with the center of the lens 303. Specific embodiments may likewise account for other aberrations that may be present in a set of image data.

Figure 4:
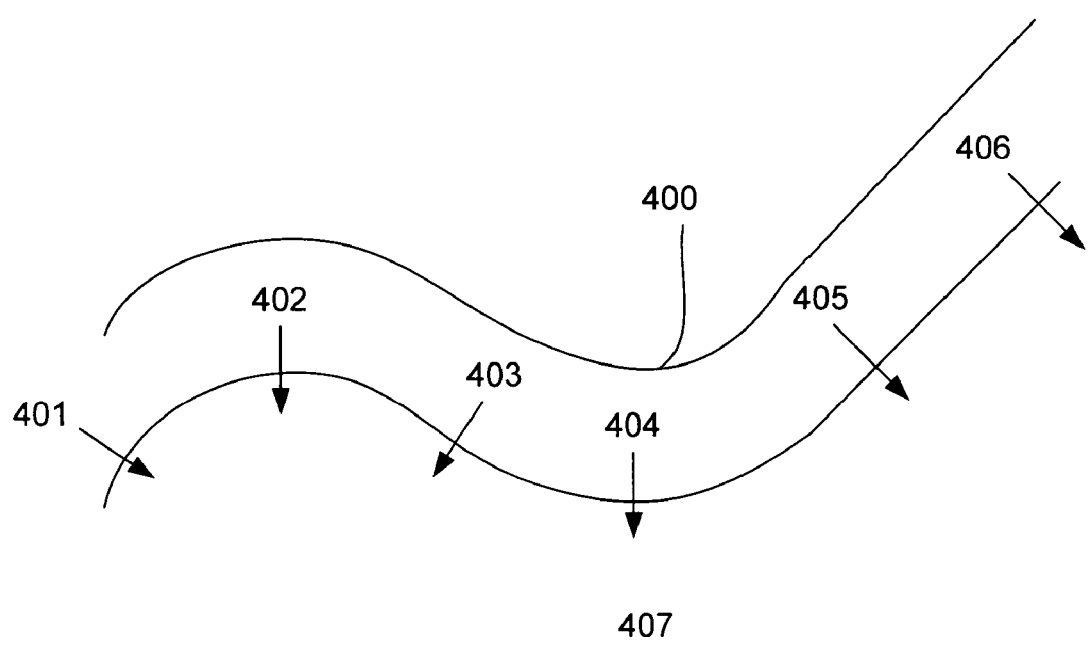
FIG. 4 illustrates disparate points on a continuum with an orientation vector associated with each respective point.

In another aspect of the invention, and referring now to FIG. 4, positional data descriptive of a location of the subject matter of an image can also be generated by the image data recording device. Positional data can include any data indicative of where the subject matter of an image is located. Some preferred embodiments can include Cartesian coordinates that are context sensitive according to the mechanism used to generate coordinate data.

For example, an image recording device, such as a camera, can be associated with a device for recording a global position, such as a global positioning system (GPS) device or other equipment. Time stamps associated with image data and time stamps associated with the GPS data can be utilized to correlate the GPS location data with image data recorded by the camera.

In still another aspect, in some embodiments, an altimeter can be used to record an altitude from which a camera records image data sets. The altitude data can be associated with an image data set, for example, metadata correlated with the image data set. Such embodiments can therefore include recordation of a latitude, longitude and altitude coordinate for a given image data set. In addition, it is also within the scope of this invention to record a time of generation of an image data set and a depth of focus for an image data set.

According to the present invention, geospatial data, such as latitude and longitude coordinates, can be generated by the GPS and stored with image data generated by the camera. In some embodiments, GPS data can be time stamped and collected once every second. However, in some instances, GPS reception can be interrupted, depending upon location relative to large object, such as multistory buildings, or cold cover. Therefore, some additional embodiments can include an accelerometer for recording motion associated with a camera and a GPS unit operatively attached to the camera.

Data from the accelerometer can indicate movement of the camera. Some accelerometers, such as micro electro-mechanical system (MEMS) accelerometers can easily be incorporated into a camera system assembly attached to a vehicle. Use of multiple MEM accelerometers positioned to measure movement in four or more directions along an x-axis, y-axis, and z-axis in relation to a camera can also be used to calculate direction of movement. The accelerometer can therefore be used to extrapolate a current position of the camera, based upon a last set of GPS geospatial data recorded.

Geospatial data can be used to indicate an initial geographic position. A change in geospatial data can be additionally utilized to indicate velocity and direction of image data set capture. Accelerometer data may also be used to indicate a velocity and direction of image data set capture. Accelerometer data may also be used to indicate a velocity and direction of camera movement. Calculations of time elapsed at the indicated velocity (such as for example, the Kalman Filter) can yield a calculated position at a time of image capture, even if the time of image capture is between GPS readings.

For example, one standard can include tracking a camera position with a GPS unit that records location at a rate of once per second. The camera can record image data at a faster rate than once per second, such as, for example, one of: 12 images per second, 24 images per second or 29.97 images per second. An initial camera position can be recorded which correlates with a GPS reading, subsequent image data capture will occur in between the one second GPS reading interval. The camera position can be determined with a calculation based upon the velocity of camera movement supplied by the accelerometer and time elapsed since a previous GPS reading.

Still other embodiments can utilize optical flow methodology and visual odometry to facilitate calculations of a camera position and the velocity of a vehicle or person from which a series of image data sets are captured. Visual odometry can be accomplished with a single omni-directional camera or with stereo cameras, and is based upon processing which tracks the position of salient features in a series of feature sets and calculates movement based upon the relative positions of the features. In some embodiments, camera based simultaneous localization and mapping (SLAM) of visual image data can also be used to facilitate calculations of velocity of a change in position of a camera used to capture image data sets. Typically, the velocity will be directly tied to the motion of a vehicle to which the camera is mounted, or a person carrying a camera rig.

Orientation of a camera can include a direction of image capture recorded by the camera. Orientation can be designated, for example, in relation to the cardinal directions, i.e. north, south, east and west. Any means available to record such a designation, such as an electronic compass, is within the scope of the present invention. However, it may be desirable to include a means to record the orientation with a greater degree of accuracy than is typically available through the use of an electronic compass.

Therefore, in some embodiments, orientation can be determined according to a fixed position of a camera in relation to the direction of travel of a vehicle (or person) used to transport the camera. For example, a plurality of cameras can be fixedly attached to a vehicle capturing Video DriveBy™ data. Each camera therefore maintains a constant direction of image capture in relation to the heading of the vehicle. Mechanics of the camera, such as, for example, lens parameters and shutter speed, can indicate a depth of field during camera image data capture. Some embodiments can also include simultaneously capturing multiple image data sets and correlating two or more of the image data sets. Correlation can be accomplished via a time stamp or other chronological or synchronous.

The position of a camera can be combined with a direction of image capture and the depth of field of the camera, to determine a location of image data captured by the camera at a particular instance in time. The present invention can also include apparatus for utilizing echo location to determine a distance of an object from a camera capturing an image data set and storing a correlated distance with the image data set. For example, radar data can be correlated with a camera image data set to calculate the location of various objects captured by the camera. A time stamp can also be combined with data to quantify a location for a particular image formed by the captured image data.

In some embodiments of the present invention data used to calculate a location of an image is stored in a metadata file space associated with the image data. For example, some embodiments can store metadata in the exchangeable image file format (EXIF), TIFFTAGS or International Press Telecommunication Council (IPTC) formats. Image data may be stored, for example in JPEG or TIFF formats. However, other metadata formats can also be used. Typically, due to the size of data files that are generated during capture of Video DriveBy™ data, the image data and metafile data are stored on an external data storage device, such as a hard disk drive operatively attached to the camera. However, in some embodiments, the data can be stored in the camera.

As discussed above, the metadata can include data descriptive of some or all of: date and time; camera settings such aperture, shutter speed and focal length; geospatial data from a GPS receiver unit; accelerometer data; inertial guidance system data; camera orientation; and camera fixed position related to vehicle travel.

Figure 5:
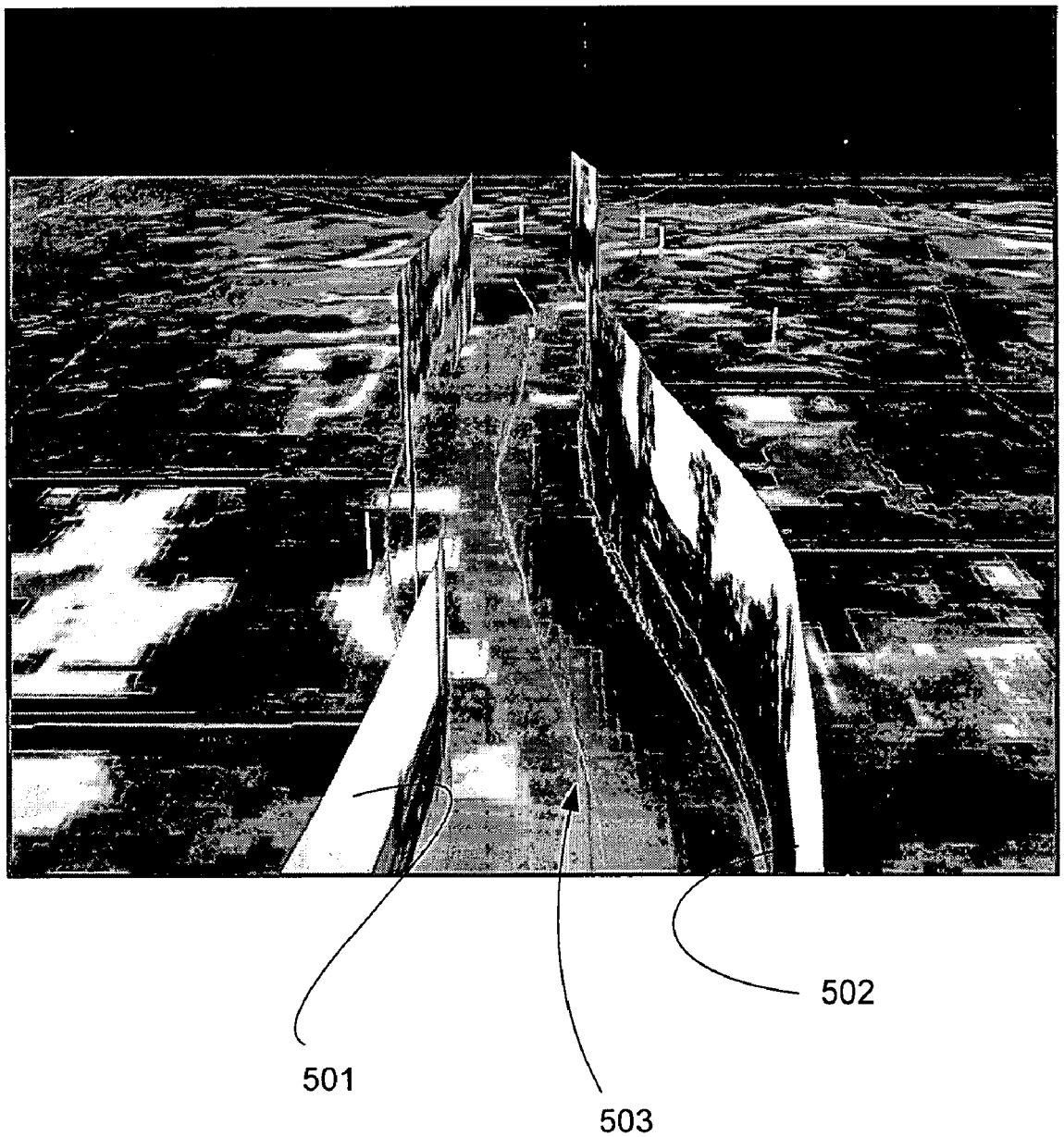
FIG. 5 illustrates a canyon formed by two continuums of image data according to the present invention.

Referring now to FIG. 5, an illustration of some RibbonView™ embodiments of the present invention is illustrated. The RibbonView™ illustrated 501-502 includes strips or ribbons of two-dimensional image data. Each strip 501-502 is generated via the capture of image data along a continuum 503. As illustrated, the continuum 503 generally follows the roadway in the center of the illustration. Each composite image 501-502 is generated through the alignment of a portion of multiple images captured as data from disparate points along the continuum 503. In some preferred embodiments, the present invention delivers two ribbons of composite images 501-502 with different views captured along the continuum. Each view is generated by a camera with a separate orientation.

It will be apparent to those schooled in the art that the length of a composite image generated according to the present invention is limited only by the ability to capture image data from additional points on a continuum and store the captured image data for post processing. The post processing allows for the alignment of portions of the image data compiled into a composite two-dimensional view that can continue so long as additional image data is made available to be added to it.

Apparatus

Figure 6:
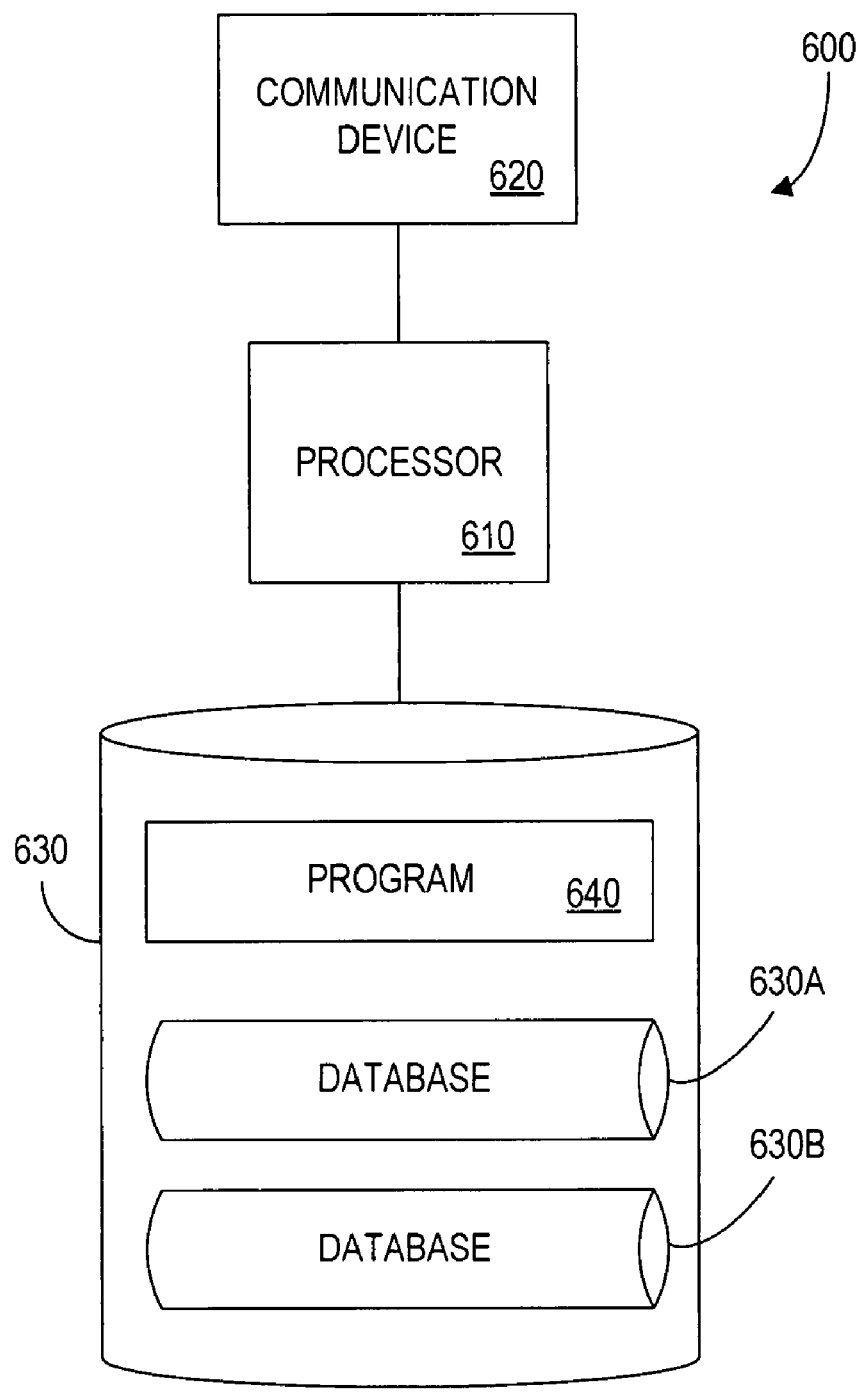
FIG. 6 illustrates apparatus that can be used to implement some embodiments of the present invention.

The teachings of the present invention may be implemented with any apparatus capable of embodying the innovative concepts described herein. Image capture can be accomplished, for example, via a digital camera capable of capturing 12 or more images per second. In addition, FIG. 6 illustrates a controller 600 that may be utilized to implement some embodiments of the present invention. The controller 600 comprises a processor unit 610, such as one or more processors, coupled to a communication device 620 configured to communicate via a communication network (not shown in FIG. 6). The communication device 620 may be used to communicate, for example, with one or more online devices, such as a personal computer, laptop or a handheld device.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 can store a program 640 for controlling the processor 610. The processor 610 performs instructions of the program 640, and thereby operates in accordance with the present invention. The processor 610 may also cause the communication device 620 to transmit information, including, in some instances, control commands to operate apparatus to implement the processes described above. The storage device 630 can additionally store related data in a database 630A and database 630B, as needed.

CONCLUSION

A number of embodiments of the present invention have been described. Nevertheless, it will be understood that various modifications may be made without departing from the spirit and scope of the invention. For example, various methods or equipment may be used to implement the process steps described herein or to create a device according to the inventive concepts provided above and further described in the claims. In addition, various integration of components, as well as software and firmware can be implemented. Accordingly, other embodiments are within the scope of the following claims.

What is claimed is:

1. Apparatus for processing a continuum of image data, the apparatus comprising:
a computer comprising a processor and a storage device in logical communication with the processor; and
executable software stored on the storage device and executable on demand, the software operative with the processor to cause the computer to:
receive digital data comprising two or more images of a subject, wherein the two or more images are captured from disparate points on a continuum;
receive positional data descriptive of a respective location of each of the two or more images align at least portions of the two or more images; and
generate a composite image comprising two dimensional image data arranged as a second continuum.

2. The apparatus of claim 1 wherein the subject comprises a geographic area and the positional data comprises a geospatial designation.

3. The apparatus of claim 1 wherein the composite comprises a ribbon of geographic image data with geospatial designations to facilitate identification of a particular geographic area.

4. The apparatus of claim 3 wherein the software is additionally operative to generate data descriptive of latitude and longitude coordinates of a camera which captured the two or more images.

5. The apparatus of claim 3 wherein the different points in a continuum comprise positions of a vehicle traveling on a roadway.

6. The apparatus of claim 1 wherein the software is additionally operative to overlay metadata on the composite image descriptive of the composite image.

7. The apparatus of claim 1 wherein the software is additionally operative to overlay links to additional data related to the composite image.

8. The apparatus of claim 7 wherein the additional data is related to the composite image based upon the positional data.

9. The apparatus of claim 3 wherein each of the two or more images are captured with a camera at a position about orthogonal to the subject matter.

10. The apparatus of claim 9 wherein the camera is at an angle of between about 85 degrees and about 95 degrees relative to the subject matter.

11. The apparatus of claim 9 additionally comprising an altimeter and wherein the software is additionally operative to record data indicative of an altitude of the camera at the instance of image data set generation.

12. The apparatus of claim 1 wherein the two or more images are captured with a camera oriented in a direction about orthogonal to a line between two points on the continuum.

13. The apparatus of claim 12 wherein the camera is at an angle of between about 75 degrees and about 105 degrees relative to the line.

14. The apparatus of claim 1, wherein the composite image comprises one or more vertical slices of at least some of the two or more images.

15. The apparatus of claim 14 wherein the images are captured by a camera mounted to a vehicle traveling in proximity to the subject, wherein the subject comprises a geographic parcel and a width of each vertical slice is based upon a speed of image capture of the camera and a velocity of vehicle travel.

16. The apparatus of claim 1 additionally comprising a data file comprising the composite image and geospatial data descriptive of the composite image.

17. The apparatus of claim 16 wherein the structure of the data file comprises multiple digital images and geospatial data stored between at least some of the multiple digital images.

18. The apparatus of claim 3 wherein the software is additionally operative to combine the composite image with meta data.

19. The apparatus of claim 18 wherein the meta data comprises one or more of: camera aperture, camera shutter speed; camera focal length; accelerometer data; inertial guidance system data; camera orientation; and camera fixed position related to vehicle travel.

20. The apparatus of claim 18 wherein the meta data comprises a date and time of image data capture.

* * * * *